United States Patent
Santarelli

[15] 3,692,920
[45] Sept. 19, 1972

[54] RACEWAY FOR BEDS OF HOSPITALS AND THE LIKE

[72] Inventor: Sandro Santarelli, V.le Borri 92, Varese, Italy

[22] Filed: April 9, 1971

[21] Appl. No.: 132,647

[30] Foreign Application Priority Data

April 13, 1970 Italy.....................23235 A/70

[52] U.S. Cl. .....................174/48, 240/2 R, 240/9 R
[51] Int. Cl. ..........................................H02g 3/18
[58] Field of Search ........174/48, 49; 240/2 R, 73 R, 240/51.11 R, 9 R, 147; 317/99

[56] References Cited

UNITED STATES PATENTS

| | | | |
|---|---|---|---|
| 2,998,508 | 8/1961 | Bobrick | 240/51.11 R |
| 3,084,247 | 4/1963 | Bobrick | 174/48 X |
| 3,200,244 | 8/1965 | Meyer | 174/48 UX |
| 3,267,332 | 8/1966 | Bobrick | 174/48 UX |
| 3,461,349 | 8/1969 | Meyer | 174/48 X |

*Primary Examiner*—Lewis H. Myers
*Assistant Examiner*—D. A. Tone
*Attorney*—Michael S. Striker

[57] ABSTRACT

An elongated base plate is mounted on a wall. Support means forwardly of the base plate support electrical conductors and pipes in a suspended manner along the base plate. A first cover plate forms a first compartment which houses the conductors and pipes, the latter being readily accessible by moving the first cover plate. A second cover plate forms, with the first cover plate, a second compartment which houses utility output devices which are connected to the conductors and pipes and which are readily accessible by moving the second cover plate.

13 Claims, 6 Drawing Figures

PATENTED SEP 19 1972

INVENTOR.
SANDRO SANTARELLI

By: Michael I. Kroll
    ATTORNEY

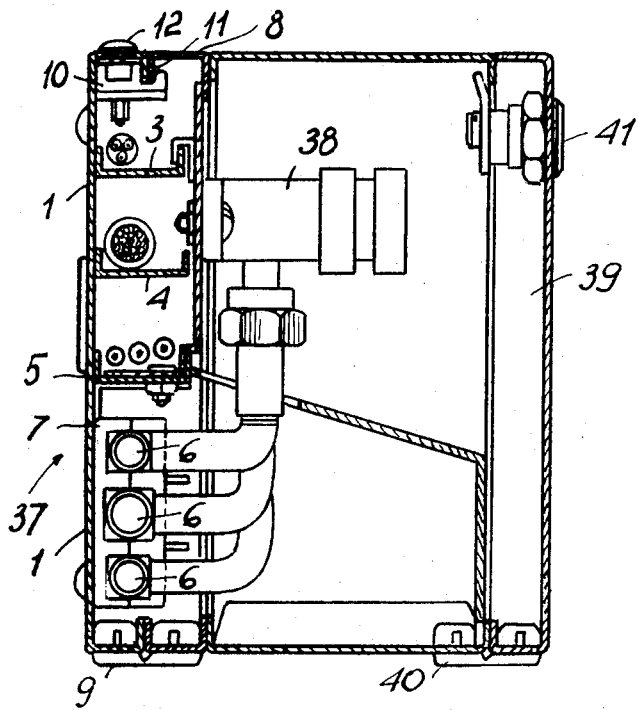
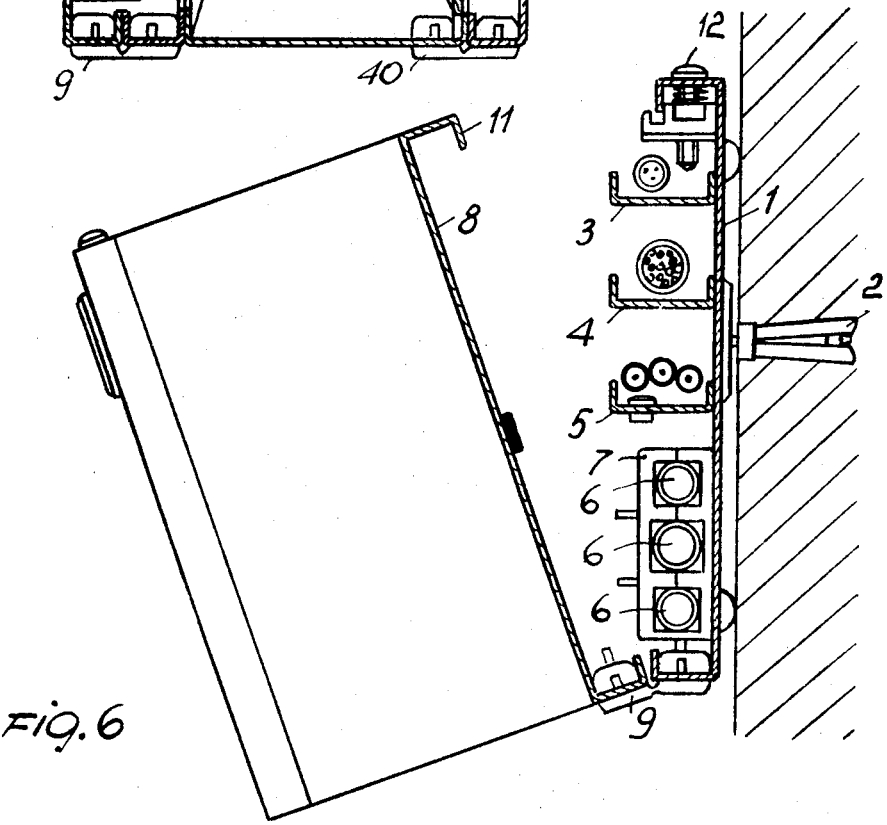

RACEWAY FOR BEDS OF HOSPITALS AND THE LIKE

The present invention relates to a raceway for beds of hospital and the like.

It is commonly known that for each bed, in hospitals and the like, it is necessary to supply services such as electric power for lighting, for radio sets and the like, current outlets for miscellaneous utilities, along with pipes for oxygen, and for compressed air.

It is known in the art to provide raceways mountable onto walls, above the head of each single bed, which carry both the conducting and the the arriving pipes, along with the lighting lamps, the intake cocks of the different pipes and the electrical equipment, such as switches, outlets of different type and the like.

The raceways known in the art are however difficult to install and to maintain, since they do not permit an easy access to the conductors and to the pipes, and accordingly they are prepared in place or in the workshops and thereafter installed onto the wall, and further connected to the different conductors and pipes.

An object of the raceway in accordance with the present invention is to permit easy installation of the different utilities and permit easy access to same for maintenance purposes.

The, raceway in accordance to the present invention is characterized in that it has a shaped base plate arranged to be secured as a first element to the wall and equipped with seats or supports which carry the electrical conductors and the pipes in a suspended in air and fully exposed manner. A cover cooperates with the base plate which with the latter comprises a closed chamber or first compartment, enclosing all conductors and pipes. Onto said cover is installed a longitudinal box-like case or cover supporting the different output devices desired in the raceway, to form a second compartment which is divided into different sections individually accessible through the movement of the front walls.

The connection between said base and said cover can be carried out through upper engagement elements and lower hinges, in such a manner that access to said first compartment, for maintenance purpose for example, is permitted by tilting said cover member.

The object of this invention is illustrated in the accompanying drawings, wherein:

FIG. 5 is a cross-section taken along the Line V—V of FIG. 1 above;

FIG. 6 is a cross-section, schematic, illustrating the tilting of said cover with respect to said base.

Figure 1:
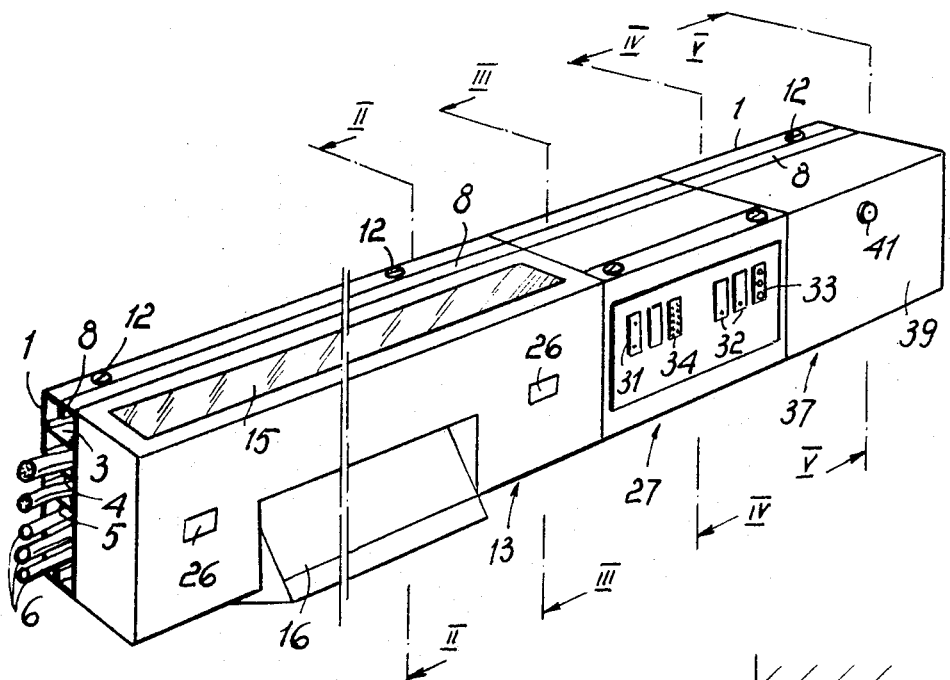
FIG. 1 is a perspective view of said raceway.

Referring now to the FIGS. 1 through 6, the raceway for hospitals and the like, in accordance with the present invention, comprises a base plate 1, shaped, and adapted to be secured onto a wall by fastener means known in the art, such as nails of the expansion type 2. The plate 1 is provided on its front face with upper set of seats or mounts 3, 4 and 5 for supporting the electrical conductors of the different types, such as conductors to supply lamps, for motive power and other types of conductors, for example for telephones, line radio, cables for radio and television set aerials and the like. The base 1 is secured onto the wall on its open front face, in a manner that it promotes the arranging of the above conductors. At the lower portion, the plate 1 has space into which some pipes 6 are installed which are commonly used in the hospitals for delivering gas or oxygen for inhalation. The pipes are held in place by means of supports 7 properly spaced.

The base plate 1, once completed and mounted on the wall and the conductors and pipes are layed upon the mounts 3, 4 and 5, is covered by means of a front cover means 8 comprising a shaped longitudinal front plate to form a first compartment. The cover means 8 is connected to the plate 1 by means of lower hinges 9, for example of the yieldable plastics type, known in the art, and by means of upper locks 10 which engage the juxtaposed edges 11 of said cover 8 and of the base 1 by tightening a screw 12. The closing position is clearly illustrated in FIGS. 2, 3 and 4. This type of connection permits free access to the different conductors and pipes, since it is be sufficient to unscrew the screw 12 and to tilt the cover 8 about the hinge 9.

Onto the cover 8, covers enclosing the elements or output devices of the different utilities are installed to form a second compartment, the latter forming a single assembly having a plurality of sections, imparting to the group the shape of a continuous box-like case.

Figure 2:
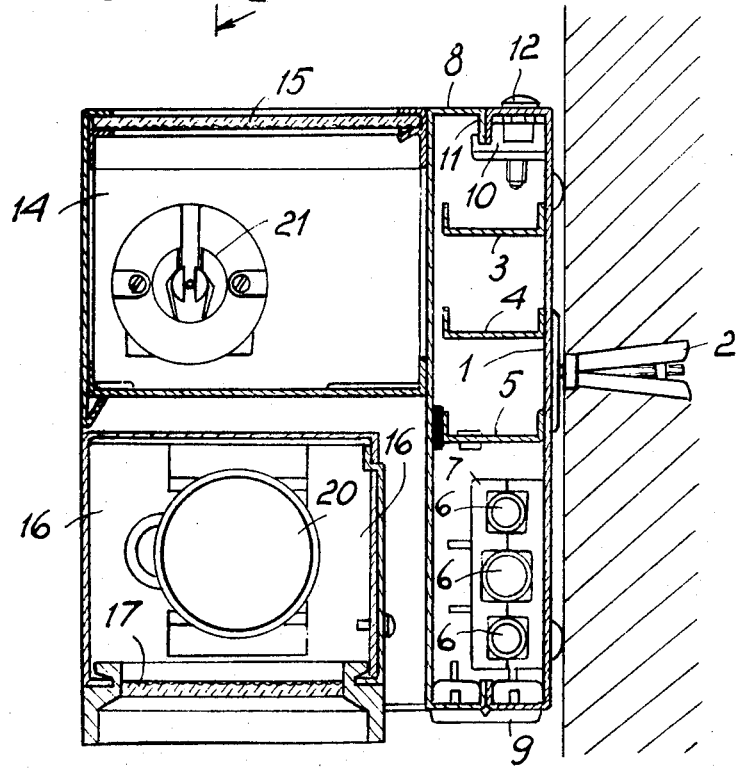
FIG. 2 is a cross-section taken along the Line II—II of FIG. 1 above.
Figure 3:
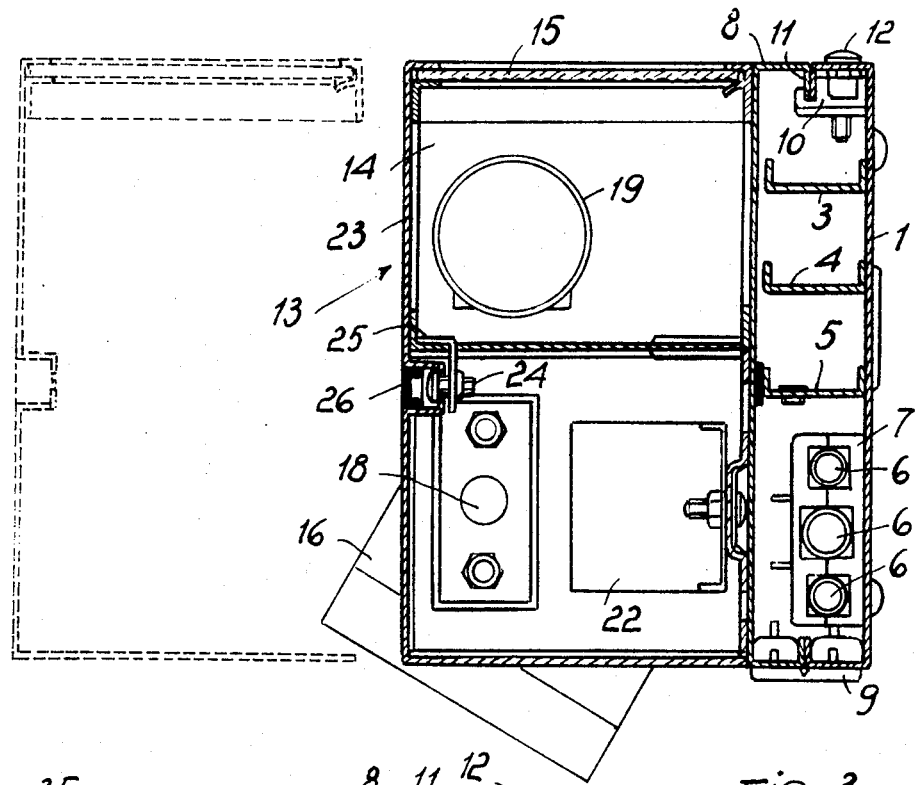
FIG. 3 is a cross-section taken along the Line III—III of the FIG. 1 above.
Figure 4:
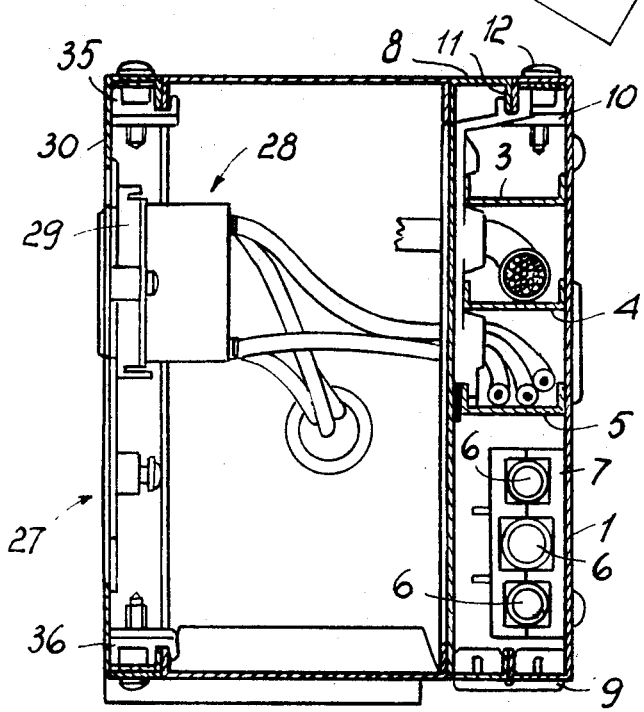
FIG. 4 is a cross-section taken along the Line IV—IV of the FIG. 1 above.

A first section, shown in FIGS. 1, 2 and 3, is the one indicated by the numeral 13 and comprises an upper housing 14 (FIGS. 1, 2 and 3) for enclosing the fixed lighting lamps which supply the light upwardly through a transparent wall 15 along with an orientable housing 16 into which the lamps for supplying the light downwardly are enclosed, through the transparent plate 17. The section 16 can rotate around two end pivots 18 in a manner to change the direction of the light.

The lamps disposed into the housings 14 and 16 can be fluorescent bulbs 19 and 20, supported by lamp-holders at the ends 21 or they can be incandescent bulbs.

As best illustrated on FIGS. 1 and 3, the section 13, on the two sides of said lamp-holder 16 shows two side portions reserved to house different optional devices, such as reactors 22, starters etc.

The seat 13 is covered by means of a plate 23 (FIG. 3) secured through screws 24 with fixed clamps 25 and covered by the caps 26, in such a manner that upon unloosening the screws 24, the entire front portion can be removed, including the upper transparent plate 15 to get free access to the bulbs 19, in a manner as to facilitate maintenance.

Adjacent to section 13, a further seat 27 (FIGS. 1 and 4) is provided, which encloses all the units 28 representing different utility output.

The output devices, in general, are of the known type in the art, and are mounted onto small supporting frames 29 and installed onto the rear face of a front wall or plate 30, equipped with one or more rows of apertures out of which extend the output devices, such as a current outlet 31, switches 32 for the lamps, a jack 33, a multiple connector 34, reserved, for example, to connect a downwardly directed cable for the controls and at the patient's reach. The front wall 30 is rapidly removable through the use of locks 35 and 36, upper and lower positioned, which are, similar to locks 10 described above, in a manner as to ease the different electrical connections and access for maintenance purposes.

Adjacent to section 27, the section 37 (FIGS. 1 and 5) is located, which encloses all connection cocks 38, known in the art, for the intake of the different utilities, such as compressed air or oxygen for inhalation, said cocks being enclosed into a front wall 39 tiltable over a lower hinge 40 and locked by means of a lock 41 actuable through a key, in a manner as to prevent access to unqualified personnel.

As above stated and illustrated, the object of the raceway in accordance to the present invention, useful for hospitals in general, is not only suitable to house all utilities necessary in the hospitals and the like, but to permit a fast installation, free from difficulties, of the different elements or user devices, along with ease of maintainance, all the matter illustrated being in keeping with the safety rules, in particular for the manner in which all the live output devices are housed and enclosed.

We claim:

1. A console comprising an elongated base plate adapted to be mounted on a wall, support means fixed to and projecting forwardly from said base plate for supporting pipes and electrical cables; first cover means forming with said base plate a first compartment housing said support means and cables and pipes thereon, said first cover means being mounted on said base plate movable between a closed position and an open position in which the elements mounted on said support means are freely accessible; second cover means mounted in front of said first cover means and forming with the latter a second compartment located forwardly of said first compartment, said second cover means comprising a front plate and at least said front plate being movable between a closed position and an open position in which the interior of said second compartment is freely accessible; and a plurality of output devices in said second compartment respectively connected to said cables and said pipes.

2. A console as defined in claim 1, wherein said support means are arranged along the length of said elongated base plate for supporting said pipes and electrical cables at least along a portion of said console.

3. A console as defined in claim 1, wherein said first cover means is pivotally mounted on said base plate.

4. A console as defined in claim 1, wherein said front plate is pivotally mounted on said first cover means.

5. A console as defined in claim 1, wherein said front plate is removably mounted whereby the latter can be separated from said first cover means.

6. A console as defined in claim 1, wherein said second compartment comprises a plurality of sections arranged one adjacent to the other along the length of said elongated base plate, each section having mounted therein at least one of said plurality of output devices.

7. A console as defined in claim 6, wherein one of said sections is a light generating section, and wherein said output device is a lamp.

8. A console as defined in claim 7, wherein said light generating section further comprises a housing mounted on the latter for pivoting about an axis substantially parallel to the direction of said elongated base plate, said housing being arranged to direct light generated therein in substantially a single direction in each of its axial positions, and said lamp being mounted on said housing.

9. A console as defined in claim 6, wherein said front plate is transparent, said section further having a top plate which is transparent.

10. A console as defined in claim 6, wherein one of said sections is an electrical supplying section, and wherein said output devices included in the latter section are electrical outlets, switches, jacks and multiple connectors.

11. A console as defined in claim 10, wherein said front plate is provided with openings, and said output device are accessible through the latter.

12. A console as defined in claim 6, wherein one of said sections a pipe outlet section, and wherein said output devices include cocks.

13. A console as defined in claim 12, further comprising a lock for preventing said front plate from being moved into the open position when the lock is closed.

* * * * *